E. W. & C. J. ROBINSON.
BARREL MAKING MACHINE.
APPLICATION FILED JAN. 22, 1918.

1,300,025.

Patented Apr. 8, 1919.
7 SHEETS—SHEET 1.

INVENTORS
EDWARD W. ROBINSON
CHARLES JEWELL ROBINSON
BY THEIR ATTORNEY
Harry Smith

E. W. & C. J. ROBINSON.
BARREL MAKING MACHINE.
APPLICATION FILED JAN. 22, 1918.

1,300,025.

Patented Apr. 8, 1919.
7 SHEETS—SHEET 2.

INVENTORS
EDWARD W. ROBINSON
CHARLES JEWELL ROBINSON
BY THEIR ATTORNEY
Harry Smith

E. W. & C. J. ROBINSON.
BARREL MAKING MACHINE.
APPLICATION FILED JAN. 22, 1918.

1,300,025.

Patented Apr. 8, 1919.
7 SHEETS—SHEET 4.

INVENTORS
EDWARD W. ROBINSON
CHARLES JEWELL ROBINSON
BY THEIR ATTORNEY
Harry Smith

E. W. & C. J. ROBINSON.
BARREL MAKING MACHINE.
APPLICATION FILED JAN. 22, 1918.

1,300,025.

Patented Apr. 8, 1919.
7 SHEETS—SHEET 5.

INVENTORS
EDWARD W. ROBINSON
CHARLES JEWELL ROBINSON
BY THEIR ATTORNEY
Harry Smith E. W. & C. J. ROBINSON.
BARREL MAKING MACHINE.
APPLICATION FILED JAN. 22, 1918.
1,300,025.
Patented Apr. 8, 1919.
7 SHEETS—SHEET 6.
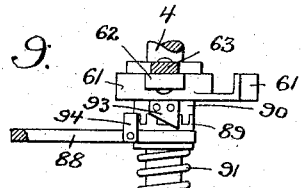
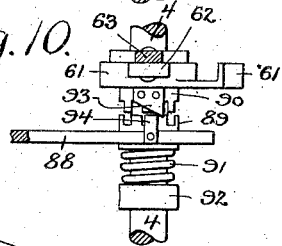
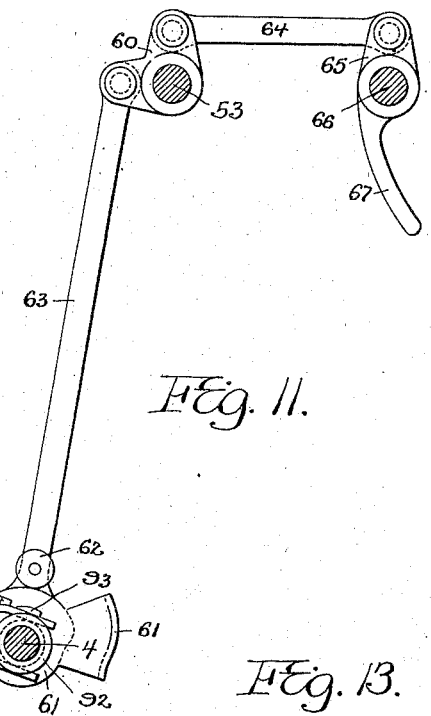
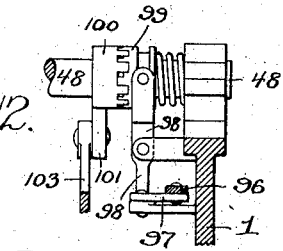
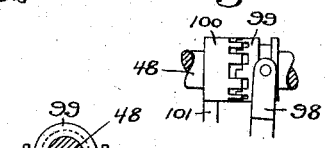
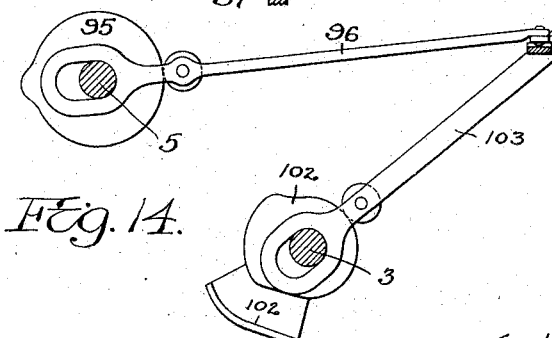
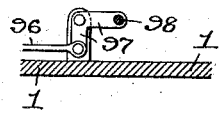
INVENTORS
EDWARD W. ROBINSON
CHARLES JEWELL ROBINSON
BY THEIR ATTORNEY
Harry Smith

E. W. & C. J. ROBINSON.
BARREL MAKING MACHINE.
APPLICATION FILED JAN. 22, 1918.

1,300,025.

Patented Apr. 8, 1919.
7 SHEETS—SHEET 7.

INVENTORS EDWARD W. ROBINSON
CHARLES JEWELL ROBINSON
BY THEIR ATTORNEY Harry Smith

UNITED STATES PATENT OFFICE.

EDWARD WILLIAM ROBINSON AND CHARLES JEWELL ROBINSON, OF SAVANNAH, GEORGIA.

BARREL-MAKING MACHINE.

1,300,025.

Specification of Letters Patent.

Patented Apr. 8, 1919.

Application filed January 22, 1918. Serial No. 213,232.

*To all whom it may concern:*

Be it known that we, EDWARD W. ROBINSON and CHARLES JEWELL ROBINSON, citizens of the United States, residing in Savannah, Georgia, have invented certain Improvements in Barrel-Making Machines, of which the following is a specification.

This invention is an improvement upon that forming the subject of previous Letters Patent No. 1,052,177 and No. 1,126,285, the object of the present invention being to simplify the construction and increase the efficiency of a machine of the type shown in said patents.

In the accompanying drawings—

Fig. 4 is a top view of the machine omitting the stave-feeding mechanism;

Figs. 9 and 10 are top views of certain clutch mechanism employed in connection with one of the shafts of the machine;

Fig. 11 is a view of the mechanism employed for operating a certain stave clamping device of the machine;

Figs. 12 and 13 are side elevations of clutch mechanism employed in connection with a shaft connected with the operation of the wire twisting devices of the machine;

Fig. 14 is a side elevation, partly in section, of certain mechanism employed for operating said clutch;

Fig. 15 is a sectional plan view of certain of the elements of said mechanism;

Fig. 20 is a side elevation of a clutch which operates the driving shaft for the wire twisters.

Figure 1:
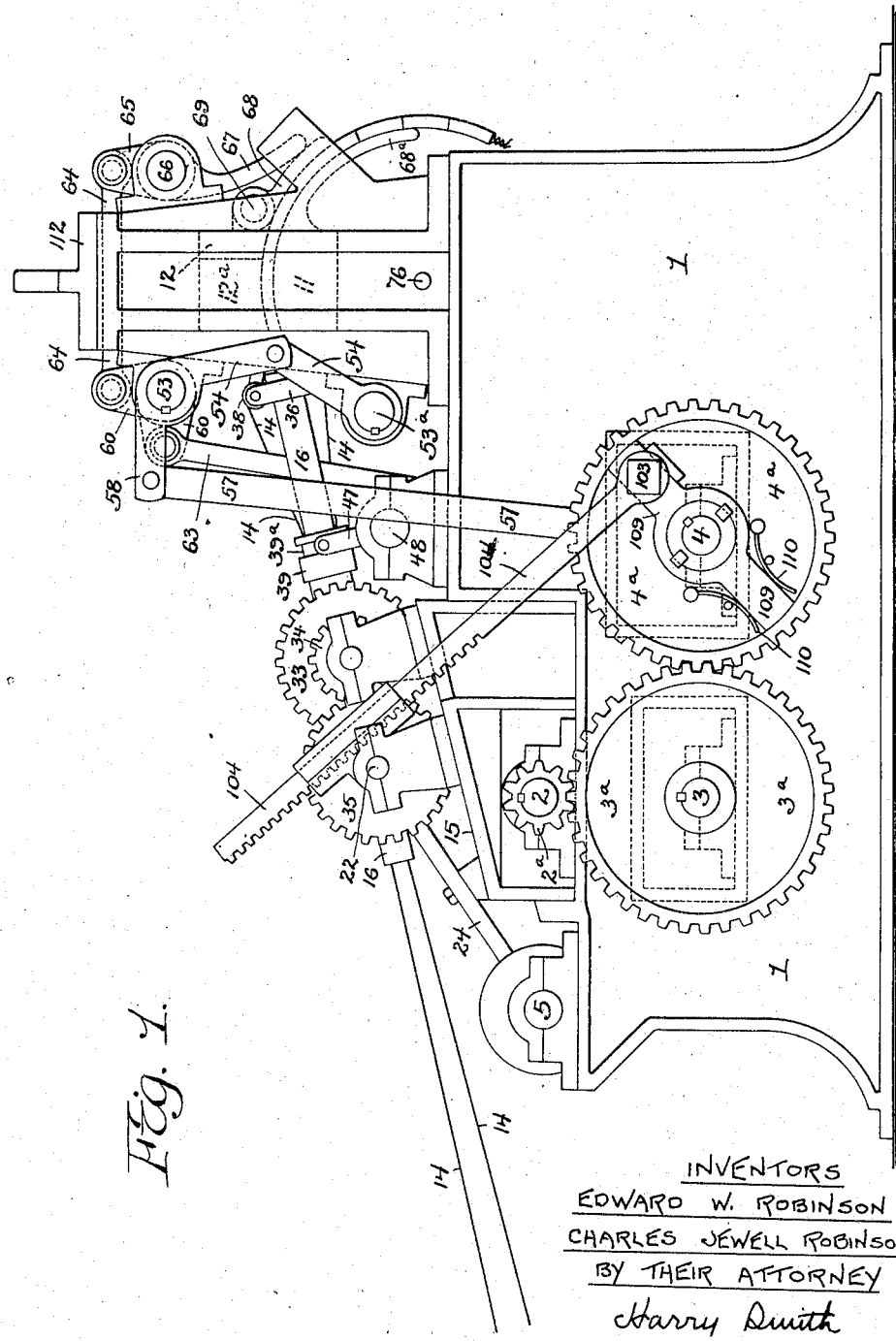
Figure 1 is a side elevation of a machine constructed in accordance with our invention, looking in the direction of the arrow, $x$, Fig. 4.

The side frames 1 of the machine provide support for the bearings for four rotating transverse shafts 2, 3, 4 and 5, the shafts 3 and 4 being geared together by intermeshing spur wheels $3^a$ and $4^a$ so as to rotate in opposite directions, but at the same speed, and the spur wheel $3^a$ being driven from the shaft 2 by means of the pinion $2^a$, as shown in Fig. 1.

The shafts 3 and 4 rotate once for each stave which is inserted, and the shaft 5 rotates once for each set of staves which is being bound together to constitute a barrel blank.

Figure 5:
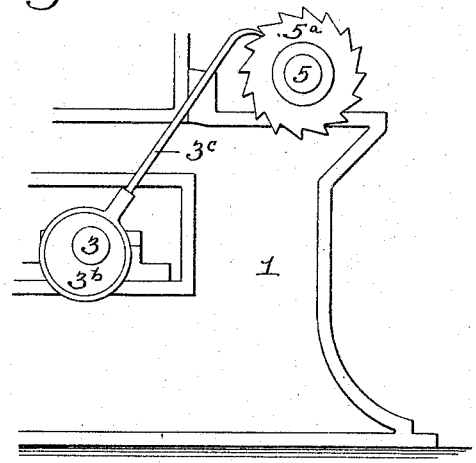
Fig. 5 is a side elevation of part of the machine looking in the direction of the arrow $y$, Fig. 4.

The shaft 5 has a series of intermittent movements of partial rotation imparted to it from the shaft 3 through the medium of an eccentric $3^b$ on said shaft, the strap of said eccentric having a pawl finger $3^c$ which engages the teeth of a ratchet wheel $5^a$ on the shaft 5, as shown in Fig. 5.

Figure 3:
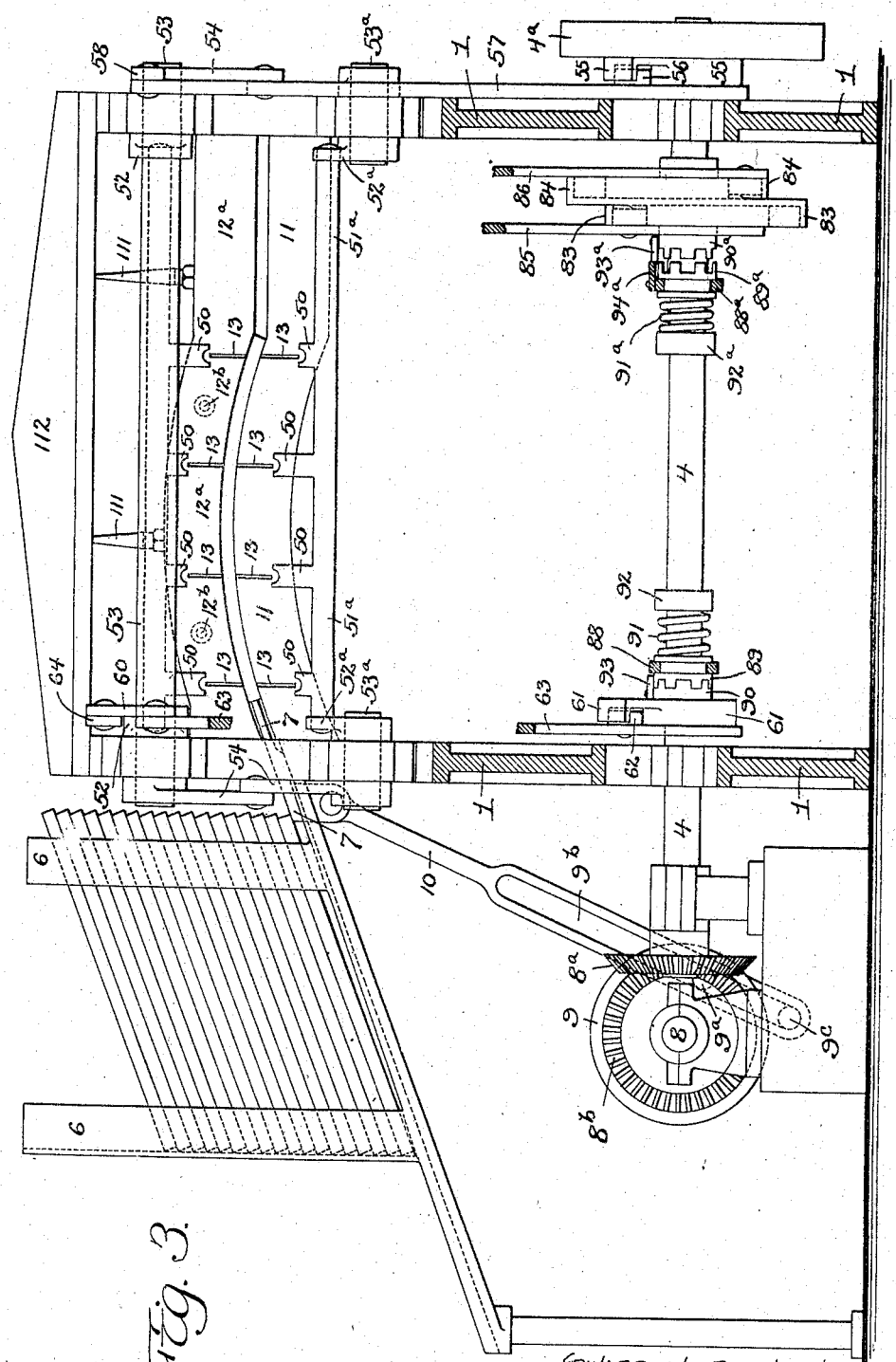
Fig. 3 is a transverse section on the line 3—3, Fig. 2, with some of the parts omitted in order to prevent confusion.
Figure 8:
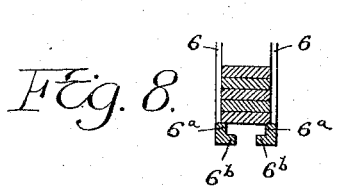
Fig. 8 is a transverse sectional view of the lower portion of the stave support.

At one side of the machine is an upwardly projecting stave rack 6 and at the base of the same are opposite inwardly projecting flanges $6^a$ and $6^b$ (Fig. 8) the outer flanges $6^a$ serving to support the staves and the inner flanges $6^b$ serving as guides for a feed dog 7 to which reciprocating movement is imparted from a longitudinal shaft 8 at one side of the machine, said shaft being driven by bevel gears $8^a$ and $8^b$ from the shaft 4 and having upon it a disk 9 with crank pin $9^a$ which engages a slot $9^b$ in an arm 10 pivotally connected at its upper end to a lug on the dog 7, as shown in Fig. 3. The slot $9^b$ in the arm 10 also receives a fulcrum pin $9^c$ so that, as the arm 10 is vibrated by reason of its engagement with the crank pin $9^a$, it can also slide on the fulcrum pin $9^c$ and thus permit the dog 7 in its reciprocation to follow the inclined plane of the guide flanges $6^b$.

This plane is also inclined in respect to that of the stave supporting flanges $6^a$, so that when the dog 7 first acts upon the rear end of a stave it will be adjacent to the inner face of the stave and will therefore be free from liability to engage any but the lowermost stave, but as it pushes the stave forward its acting end will also rise on the end of the stave, and its hold upon the same will therefore be increased.

Figure 2:
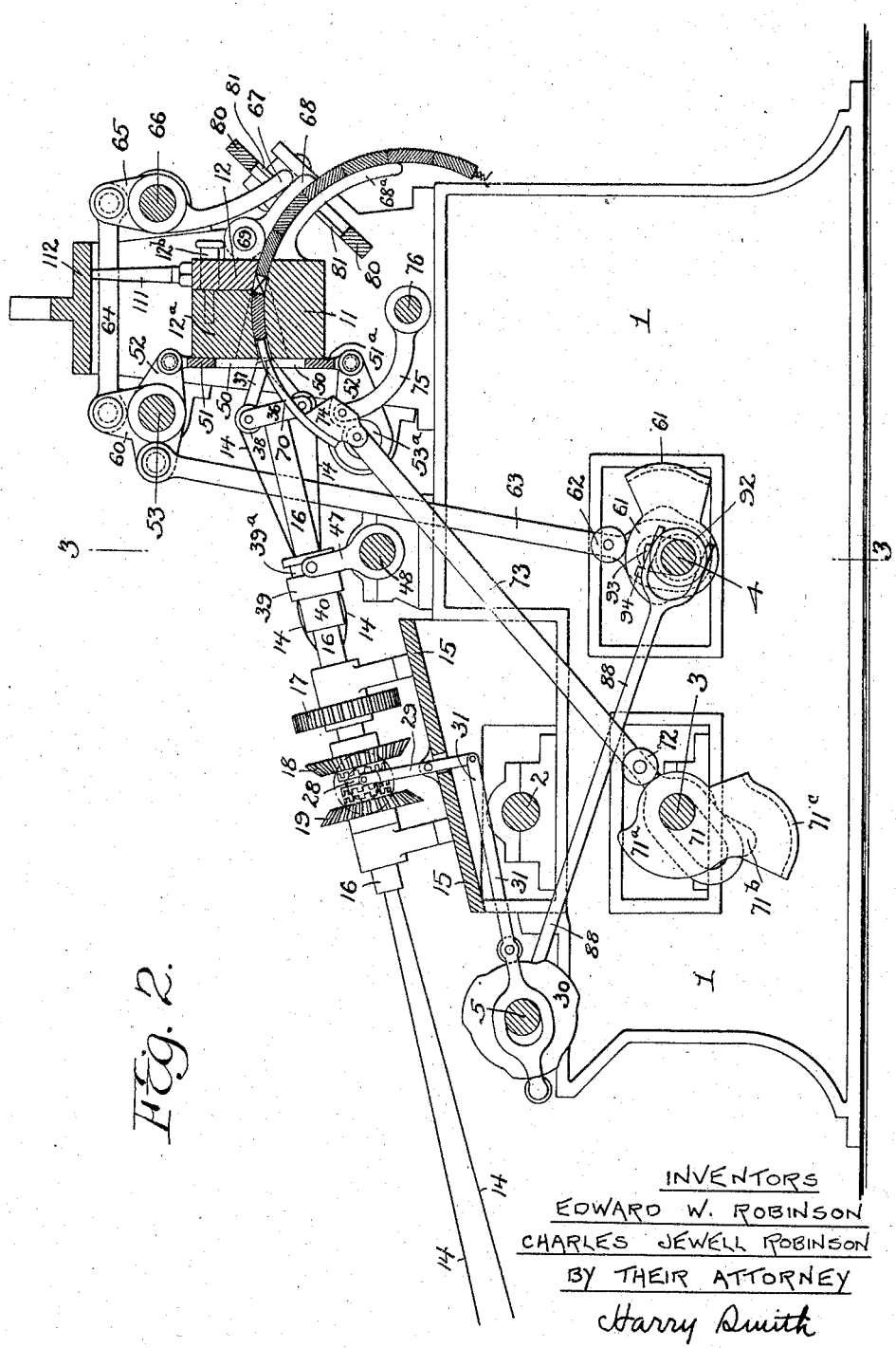
Fig. 2 is a view partly in longitudinal section and partly in elevation.

As the dog is projected it will push the stave ahead of it and between a pair of transverse bilging bridges, the lowermost of which is represented at 11 in Figs. 2 and 3, and the uppermost at 12 and 12ª in Fig. 3, the member 12 of the upper bridge being fixed in position and the member 12ª being held in its proper relation to the member 12 by means of removable locking bolts 12ᵇ, so that it can be readily withdrawn when, for any reason, it is desirable to gain access to a stave which has been thrust between the bilging bridges. Said bridges are, as shown in Fig. 3, continuous from end to end, and those faces of the bridges which act upon the stave are, as shown in Figs. 2 and 3, curved both transversely and longitudinally so as to impart the proper transverse and longitudinal bilge to a flat stave thrust longitudinally between them.

The upper and lower bilging bridges have their adjoining faces slotted transversely, as shown at 13, in Fig. 3, and by dotted lines in Fig. 2, for the reception and shedding of a number of pairs of wires 14 (four in the present instance) which are drawn from reels mounted so as to be free to turn on stationary bearings at one end of the machine, these wires are manipulated as hereinafter set forth so as to form the sheds for the reception of the successive staves and so as to be crossed between successive staves of the set and have a plurality of twists imparted to them between the terminal staves of successive sets.

Mounted in suitable bearings upon a longitudinally inclined transverse table 15 of the machine frame is a tubular shaft 16 which has a half turn imparted to it after each stave insertion, said half turns being first in one direction and then in the opposite direction, and, at certain intervals, the shaft has a plurality of movements of full rotation, such movements being effected by means of gearing illustrated in Fig. 4, on reference to which it will be observed that there is a shaft 16 for each pair of wires and that these shafts are geared together by means of intermeshing spur wheels 17 so as to operate in unison.

Mounted so as to be free to turn on one of the shafts 16 are a pair of bevel wheels 18 and 19, both of which are in mesh with a bevel pinion 20 on a shaft 21 which is mounted so as to be free to turn in a bearing on the table 15 and is in line longitudinally with another shaft 22 likewise mounted and to which it can be clutched when desired by one face of a shifting clutch sleeve 23, the latter being under control of a pivoted lever 24 which can be moved in one direction by means of a spring 25 and in the opposite direction by means of a cam 26 on a disk 27 mounted on the shaft 5, as shown in Fig. 4. The bevel wheel 18 is therefore rotated in one direction and the bevel wheel 19 in the opposite direction whenever rotative movement is imparted to the shaft 21 and either of said bevel wheels may, by means of a clutch sleeve 28 (Fig. 4) be clutched to the shaft 16 on which it is mounted. The sleeve 28 is controlled by a lever 29 (Fig. 2) pivotally mounted on the table 15 and having movement imparted to it from a cam 30 on the shaft 5 through the medium of a reciprocated rod 31. The clutch sleeve 23, when in the position shown in Fig. 4, serves to connect the shaft 20 directly to the shaft 22, but said shafts may also be connected indirectly, through the medium of intermeshing spur wheels 32, 33, 34 and 35, when the clutch sleeve 23 is moved into engagement with a clutch face on said spur wheel 35, the character of the spur wheels 32, 33, 34 and 35 being such that when the shaft 21 is thus driven it will rotate a plurality of times for each rotation of the shaft 22.

Figure 6:
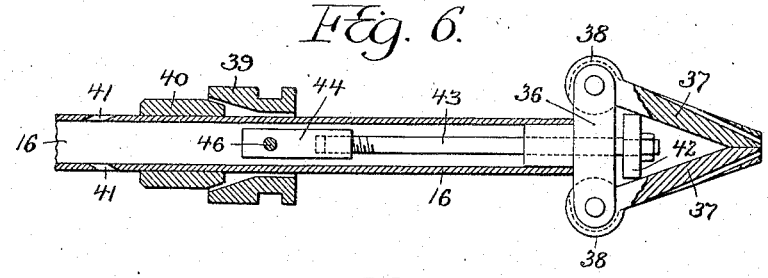
Figs. 6 and 7 are longitudinal sectional views on a larger scale than Figs. 2 and 4 of the means for shedding, twisting and imparting tension to the wires whereby the staves are bound.
Figure 7:
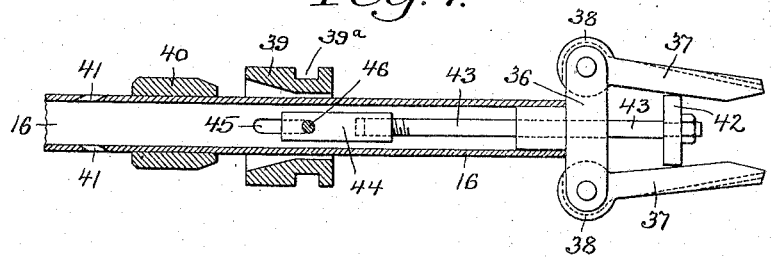

As shown in Figs. 6 and 7 the inner end of each of the shafts 16 has a head 36, to the ends of which are pivoted jaws 37, the head also having mounted thereon guide rollers 38 for the wires 14, the latter passing through openings in the jaws 37, thence over the rolls 38, thence between the outer face of the shaft 16 and a longitudinally movable slide 39 thereon, thence between the beveled inner face of said slide and the corresponding beveled outer face of a block 40 on the shaft, and thence through openings 41 to the interior of said shaft.

The jaws 37 may be caused to swing outwardly by the action thereon of a head 42 on a rod 43 disposed within the shaft 16 and having an internal head 44 through which and through longitudinal slots 45 in the shaft 16 passes a transverse pin 46 which engages with the slide 39. The slide 39 is provided with a groove 39ª for the reception of pins projecting from a fork 47 on a transverse rock shaft 48 (see Fig. 2) so that when said shaft 48 is rocked in one direction the jaws 37 will be expanded, as shown in Fig. 7, and the wires will be released from confinement between the block 40 and slide 39 and hence will be relieved from tension, but when said shaft 48 is rocked in the opposite direction the jaws 37 will be permitted to contract, as shown in Fig. 6 and the wires will be clamped between the block 40 and slide 39 so as to be subjected to tension.

Figure 16:
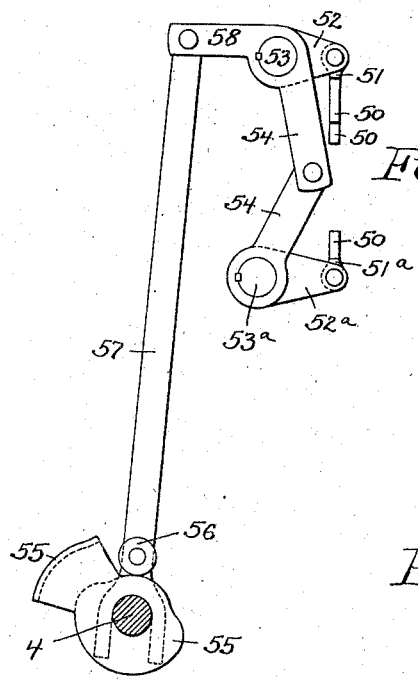
Fig. 16 is a side elevation of mechanism employed for pressing the wires upon the bilged staves.

When the jaws 37 are closed, as in Figs. 2 and 6, they are prevented from opening by reason of the contact therewith of fingers 50 (Fig. 3) projecting from upper and lower presser bars 51 and 51ª which are pivotally mounted, respectively, upon arms 52 and 52ᵃ, the arms 52 being carried by an upper rock shaft 53 and the arms 52ᵃ being carried by lower rock shafts 53ᵃ which are operated from the shaft 53 by means of interlocking arms 54, so that rocking of the shaft 53 will also effect simultaneous rocking of both of the shafts 53ᵃ in the opposite direction. Rocking of the upper shaft 53 is effected by a double-acting cam 55 on the shaft 4 (Fig. 16), said cam acting upon a roller 56 on a bar 57 which is connected to an arm 58 on the upper rock shaft 53.

On reference to Fig. 3 it will be noted that the recesses in the ends of the fingers 50 are of segmental form, so that pressure of said fingers upon the jaws 37 will not prevent the rotation or partial rotation of said jaws with the shafts 16.

Mounted so as to be free to rock on the upper shaft 53 is a bell crank lever 60, (Fig. 2) to which rocking movement is imparted from a double-acting cam 61 on the shaft 4, said cam acting on a roller 62 on a bar 63 which is connected at its upper end to said bell crank lever 60, and from the latter extends a connecting rod 64 to an arm 65 on a rock shaft 66 on the other side of the bilging bridges, this latter rock shaft having a cam 67 which bears upon a clamping plate 68 pivotally mounted at 69 on the upper bilging bridge 12 and serving to clamp, against a segmental supporting bar 68ᵃ, the final three or four of the series of staves which have been bound between the wires 14.

Forward movement of the bound set of staves, as well as the jamming of the last introduced stave forwardly against the last stave of the prevously bound set, is effected by means of dogs 70, each of which is reciprocated by means of a double-acting cam 71 on the shaft 3, said cam having two projecting members 71ᵃ and 71ᵇ and a retracting member 71ᶜ.

Each cam 71 acts on a roller 72 on a rod 73 which is connected at its upper end to a block 74 on the corresponding dog 70, and said block is mounted at the outer end of a curved arm 75 on a shaft 76 which extends transversely across the machine below the lower bilging bridge 11, as shown in Fig. 2.

Figure 18:
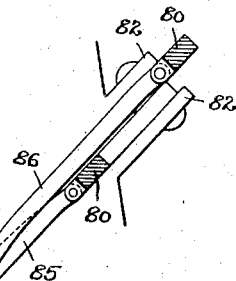
Figs. 17 and 18 are end elevations, partly in section, of means employed for operating the wire severing bars of the machine.
Figure 17:
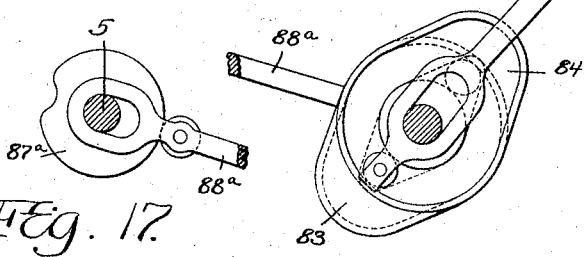
Figure 19:
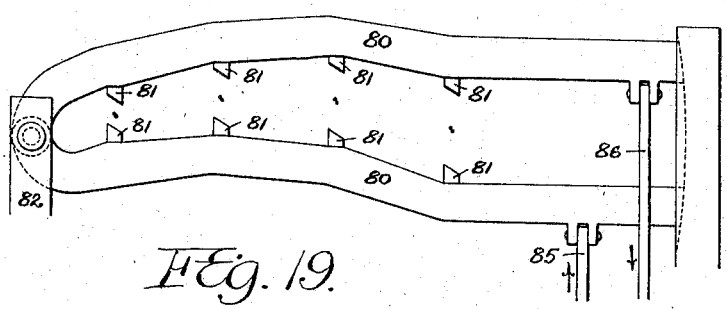
Fig. 19 is a face view of said bars.

In advance of the bilging bridges 11 and 12 are a pair of cutter bars 80 each having projecting connecting blades 81, these bars, as shown in Fig. 19, being pivoted at one end to a fixed support 82 and being moved from and toward each other at their opposite ends by means of double-acting cams 83 and 84 on the shaft 4, (see Figs. 3 and 18) these cams acting on anti-friction rollers carried, respectively, by bars 85 and 86 which are pivotally connected at their upper ends to the cutter bars 80, as shown in Figs. 18 and 19.

The cam 61 which operates the mechanism for pressing and releasing the clamping plate 68 has its operation arrested at intervals by means of a cam 87 (Fig. 11) on the shaft 5, said cam acting upon a bar 88 which embraces a grooved member 89 of a clutch which rotates with the shaft 4 and is normally pressed into engagement with a corresponding clutch member 90 on the hub of the cam 61 by means of a spring 91 interposed between the clutch member 89 and a collar 92 on the shaft 4, as shown in Figs. 3, 9 and 10. On the clutch member 90, however, is a cam plate 93 and on the bar 88 is a projecting lug 94 and when the bar 88 is pushed forwardly by the cam 87 said lug 94 contacts with the cam 93, with the result that the clutch member 89 is moved out of engagement with the clutch member 90 and the rotation of the cam 61 is temporarily arrested, with the low portion of said cam in action upon the rod 63 and the bearing arm 67 consequently in a raised position so as to remove pressure from the clamping bar 68. Similar means are employed for bringing into action at intervals the cutting bars 80, the cam on the shaft 5 in this case being represented at 87ᵃ in Fig. 4, and the clutch operating bar at 88ᵃ, while in Fig. 3 the clutch members are shown at 89ᵃ and 90ᵃ, the cam on the clutch at 93ᵃ and the cam-engaging lug at 94ᵃ.

The periodical rocking of the shaft 48, to which is due the opening of the wire-controlled jaws 37 and the application and release of the tension upon the wires, is effected by means best shown in Figs. 12 to 15, inclusive. A cam 95 on the shaft 5 acts upon a roller on a rod 96 which is connected to one arm of a bell crank lever 97 whose other arm acts upon one arm of a lever 98 pivotally mounted below the shaft 48, and whose other arm is forked and embraces the grooved member 99 of a clutch whose other member 100 is formed on the hub of an arm 101 on the shaft 48 to which arm rocking movement is imparted at intervals from the shaft 3 through the medium of a cam 102 on said shaft, said cam acting on the rocker arm 101 through the medium of a connecting rod 103.

The teeth of the clutch member 99 are notched at and near their outer ends, as shown in Fig. 13, and when said clutch member 99 is retracted these notched portions of its teeth engage the teeth of the clutch member 100, and hence the rocking movement of the shaft 48 is not as great as at other times and the binding wires are not subjected to the same amount of tension, this operation taking place when the plurality of twists is being imparted to the pairs of wires after the binding of one set of staves and before beginning operations upon the following set.

The rotation of the shaft 22 (Fig. 4) from which the wire-controlling shafts 16 derive their motion is effected by a pin 103 on a crank arm 109 which is mounted on the shaft 4 so as to be susceptible of a limited amount of pull thereon permitted by springs 110 which bear upon opposite sides of the crank arm, as shown in Fig. 1.

A crank pin 103 acts upon a rack bar 104 whose rack, through the medium of a suitable pinion, imparts back and forth movement to a shaft 105 mounted so as to be free to rock back and forth upon the shaft 22, said shaft 105 being connected, as shown in Fig. 4, to a disk 106 which, as shown in Fig. 20, carries spring pawls 107 engaging with teeth on a disk 108 which is secured to the shaft 22. The disk 106 is therefore rocked back and forth on each rotation of the shaft 4, but only the forward movements of said disk are transmitted to the shaft 22, the pawls 107 on the backward movement of the disk slipping over the disk 108 without imparting any movement thereto. When the clutch 23 is shifted from engagement with the clutch member on the shaft 21 to that on the hub of the spur wheel 35, in order to increase the number of rotations imparted to the shafts 16, a sudden strain is exerted upon the crank arm 109 and in order to relieve the strain in a measure said crank arm is free to yield under the pressure of the springs 110.

The lower bilging bridge 11 occupies a fixed vertical position and the upper bilging bridge is retained in fixed vertical position in respect to the lower bridge by means of studs 111 interposed between the member 12 of said upper bridge and the top member 112 of the fixed frame of the machine, the studs 111 being, by preference, adjustable as to length so as to vary the space between the upper and lower bilging bridges to accord with the different thicknesses of staves which may be employed.

In preparing the machine for operation the series of pairs of wires 14 are drawn from the reels at the rear of the machine first through the rear ends of the hollow shafts 16, then through the openings 41 in said shafts, then between the tension blocks 40 and slides 39, thence through the guide openings in the jaws 37, and thence to a suitable starting point where they can be retained until the first stave has been inserted into the open shed of wires.

The stave rack being filled with staves, as shown in Fig. 3, the machine operates as follows: the jaws 37 being held open, as shown in Fig. 7, the bottom stave of the pile is thrust into the open shed of wires by the forward motion of the pusher head 7, the stave being at the same time bilged longitudinally and transversely between the upper and lower bilging bridges. The jaws 37 are then closed and held in the closed position by the presser bars 51, tension is imparted to the wires, and the shafts 16 have a half turn imparted to them so as to cross the wires behind the inserted stave. The bound stave is then pushed forwardly by the swinging dogs 70, the plate 68 at this time being free from pressure so as not to interfere with the introduction of the stave between said plate and the supporting bar 69 below it. New sheds of wires being then formed, a second stave is inserted into the same by the action of the pusher head 7, and said fresh stave is driven ahead by the swinging dogs 70 under the action of the projecting member 71$^a$ of the cam 71 so as to move both staves forwardly. As soon as the forward stave is gripped between the clamps 68 and 69, the projecting member 71$^b$ of the cam 71 causes the dog 70 to jam the forward edge of the last inserted stave against the rear edge of the previously inserted stave and embed the crossed wires in the meeting edges of the staves. The wires are then again crossed behind the newly inserted stave and the operations are repeated until the desired number of staves have been bound together. At intervals, between stave insertions, the clutch member 28 is shifted between the bevel wheels 18 and 19 so that the direction of twist of the wires 14 will be reversed in order to prevent the incoming runs of wire from becoming twisted around one another.

After the final stave of a set has been inserted the clutch 23 is shifted so as to transmit motion from the shaft 22 to the shaft 21 through the medium of the multiplying gears 35, 34, 33, and 32, whereby, on the operation of the shaft 22, there will be a plurality of rotations of the shaft 21 and a consequent plurality of rotations of the hollow shafts 36 and a plurality of twists imparted to the various pairs of wires.

The last staves of the bound set being relieved from the pressure of the plate 68, through the action of the cam 87, the first stave of the new set is then inserted into the open sheds of wires, and, when said new stave is pushed forwardly by the dogs 70, it will, through the medium of the preceding twisted wires, push the series of bound staves ahead of it forward without any tendency to jam the twists together. As soon as the first stave has been pushed forward, the action of the plate 68 is again restored until the first stave of the next set is in readiness to be inserted.

When the twisted wires between the terminal staves of successive sets have reached a position between the knives 81 the knife bars 80 are caused to approach each other and said knives sever the twisted wires about the middle of their length so as to leave a plurality of twisted wires not only in the rear of the set which has already been bound but also in advance of the set which is being bound, thereby preventing the terminal staves of each set from being dislodged while the set of staves is being subsequently handled and set up into barrel form.

We claim:

1. The combination, in a machine for making wire bound barrels, of upper and lower bilging bridges having a fixed vertical relation to one another, a pusher head for driving staves longitudinally between said bilging bridges so as to impart the proper bilge to the staves, means for forcing the successive staves forwardly in edgewise direction, and means for forming sheds of pairs of wires for the reception of the successive staves.

2. The combination, in a machine for making wire bound barrels, of upper and lower bilging bridges, means for forming sheds of pairs of binding wires passing between said bilging bridges, a stave stack longitudinally in line with said bilging bridges, a reciprocated pusher head for driving staves from the bottom of the stave stack longitudinally between the bilging bridges and through successively formed sheds of the pairs of wires, and means for forcing the successive staves forwardly in edgewise direction.

3. The combination, in a machine for making wire bound barrels, of upper and lower bilging bridges occupying a fixed vertical relation to one another, means for forming sheds of pairs of binding wires passing between said bilging bridges, a reciprocated pusher head for driving staves longitudinally between the bilging bridges and through successively formed sheds of the pairs of wires, and means for forcing the successive staves forwardly in edgewise direction, the bilging device being slotted transversely for the reception of the wires of the open sheds.

4. The combination, in a machine for making wire bound barrels, of upper and lower bilging bridges occupying a fixed vertical relation to one another, means for forming sheds of pairs of binding wires passing between said bilging bridges, a reciprocated pusher head for driving staves longitudinally between the bilging bridges and through successively formed sheds of the pairs of wires, and means for forcing the successive staves forwardly in edgewise direction, the upper bilging bridge having a removable member to permit of the withdrawal of the stave from between the bridges.

5. The combination, in a machine for making wire bound barrels, of upper and lower bilging bridges occupying a fixed vertical relation to one another, means for forming sheds of pairs of binding wires passing between said bilging bridges, a reciprocated pusher head for driving staves longitudinally between the bilging bridges and through successively formed sheds of the pairs of wires, and means for forcing the successive staves forwardly in edgewise direction, the upper bilging bridge comprising two members, one fixed and one movable.

6. The combination, in a machine for making wire bound barrels, of upper and lower bilging bridges, means for forming sheds of pairs of binding wires passing between said bilging bridges, a reciprocated pusher head for driving staves longitudinally between the bilging bridges and through successively formed sheds of the pairs of wires, and means for forcing the successive staves forwardly in edgewise direction, said wire shedding device having wire guiding jaws, and means for positively opening the same.

7. The combination, in a machine for making wire bound barrels, of upper and lower bilging bridges, means for forming sheds of pairs of binding wires passing between said bilging bridges, a reciprocated pusher head for driving staves longitudinally between the bilging bridges and through successively formed sheds of the pairs of wires, and means for forcing the successive staves forwardly in edgewise direction, said wire shedding mechanism comprising a hollow shaft with external tension block thereon, means for directing the wires from the interior of said shaft over said tension block, and a slide surrounding the wires and movable from and toward the tension block so as to apply tension to the wires or release them from such tension.

8. The combination, in a machine for making wire bound barrels, of upper and lower bilging bridges, means for forming sheds of pairs of binding wires passing between said bilging bridges, a reciprocated pusher head for driving staves longitudinally between the bilging bridges and through successively formed sheds of the pairs of wires, and means for forcing the successive staves forwardly in edgewise direction, said wire shedding devices comprising a rotatable shaft with pivoted wire guiding jaws thereon, a tension block for said wires, a movable slide coöperating therewith to impart tension to the wires or release them therefrom, means for moving the slide to release the tension, and means connected with said slide for simultaneously opening the jaws.

9. The combination, in a machine for making wire bound barrel, of upper and lower bilging bridges, means for forming sheds of pairs of binding wires passing between said bilging bridges, a reciprocated pusher head for driving staves longitudinally between the bilging bridges and through successively formed sheds of pairs of wires, and means for forcing the successive staves forwardly in edgewise direction, said wire-shed-forming devices comprising wire guiding devices and means for first rocking said guiding devices so as to cross the wires and then, within the same space of time, imparting a plurality of rotating motions thereto so as to impart a plurality of twists to the wires.

10. The combination, in a machine for making wire bound barrels, of upper and lower bilging bridges, means for forming sheds of pairs of binding wires passing between said bilging bridges, a reciprocated pusher head for driving staves longitudinally between the bilging bridges and through successively formed sheds of the pairs of wires, and means for forcing the successive staves forwardly in edgewise direction, said wire shedding devices consisting of wire controlling means having, as an element, a shaft, means for imparting thereto a relatively slow rocking movement or a fast rotating movement, a clutch for engaging either of said means, and means for shifting said clutch at intervals.

11. The combination, in a machine for making wire bound barrels, of upper and lower bilging bridges, means for forming sheds of pairs of binding wires passing between said bilging bridges, a stave support, a reciprocated pusher head for driving staves longitudinally between the bilging bridges and through successively formed sheds of the pairs of wires, and means for forcing the successive staves forwardly in edgewise direction, said reciprocated pusher head being guided in a path inclined in respect to the stave support that as it pushes a stave forwardly its end in contact with the stave will, at the same time, rise on the end of the stave.

12. The combination, in a machine for making wire bound barrels, of upper and lower bilging bridges, means for forming sheds of pairs of binding wires passing between said bilging bridges, a reciprocated pusher head for driving staves longitudinally between the bilging bridges and through successively formed sheds of the pairs of wires, and means for forcing the successive staves forwardly in edgewise direction, said wire shed forming devices having operative means comprising a shaft mounted so as to be susceptible of back and forth movement, a reciprocated rack whereby such back and forth movement is imparted to said shaft, a rack-operating crank arm, an operating shaft therefor on which said arm is mounted so as to have a limited amount of swing, and springs for normally retaining said crank arm in its proper relation to the shaft, said spring permitting a limited yielding movement of the crank arm when extra strain is exerted thereupon.

In testimony whereof, we have signed our names to this specification.

EDWARD WILLIAM ROBINSON.
CHARLES JEWELL ROBINSON.

Copies of this patent may be obtained for five cents each, by addressing the "Commissioner of Patents, Washington, D. C."